Nov. 24, 1925.
E. G. SIMPSON
1,562,661
WEATHER FRAME FOR WINDSHIELDS
Filed Sept. 15, 1924 — 2 Sheets-Sheet 1
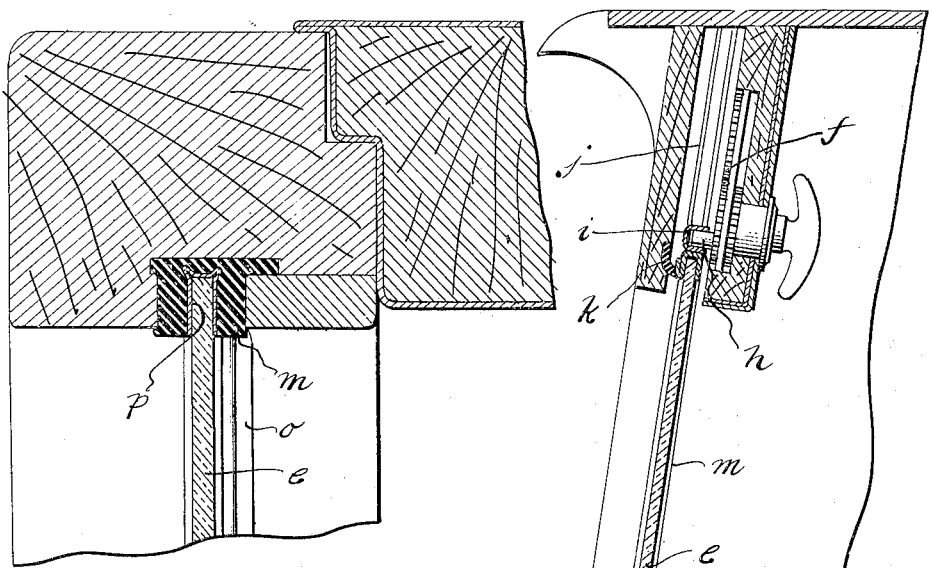
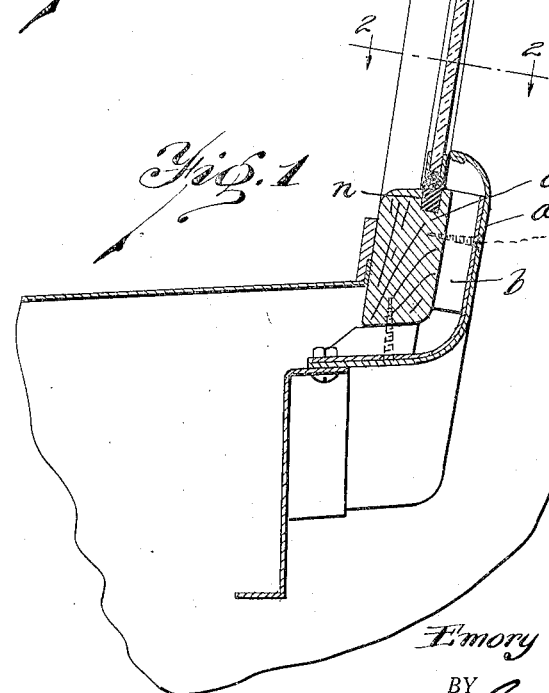
INVENTOR.
Emory Glenn Simpson
BY
Stuart C. Barnes
ATTORNEY.

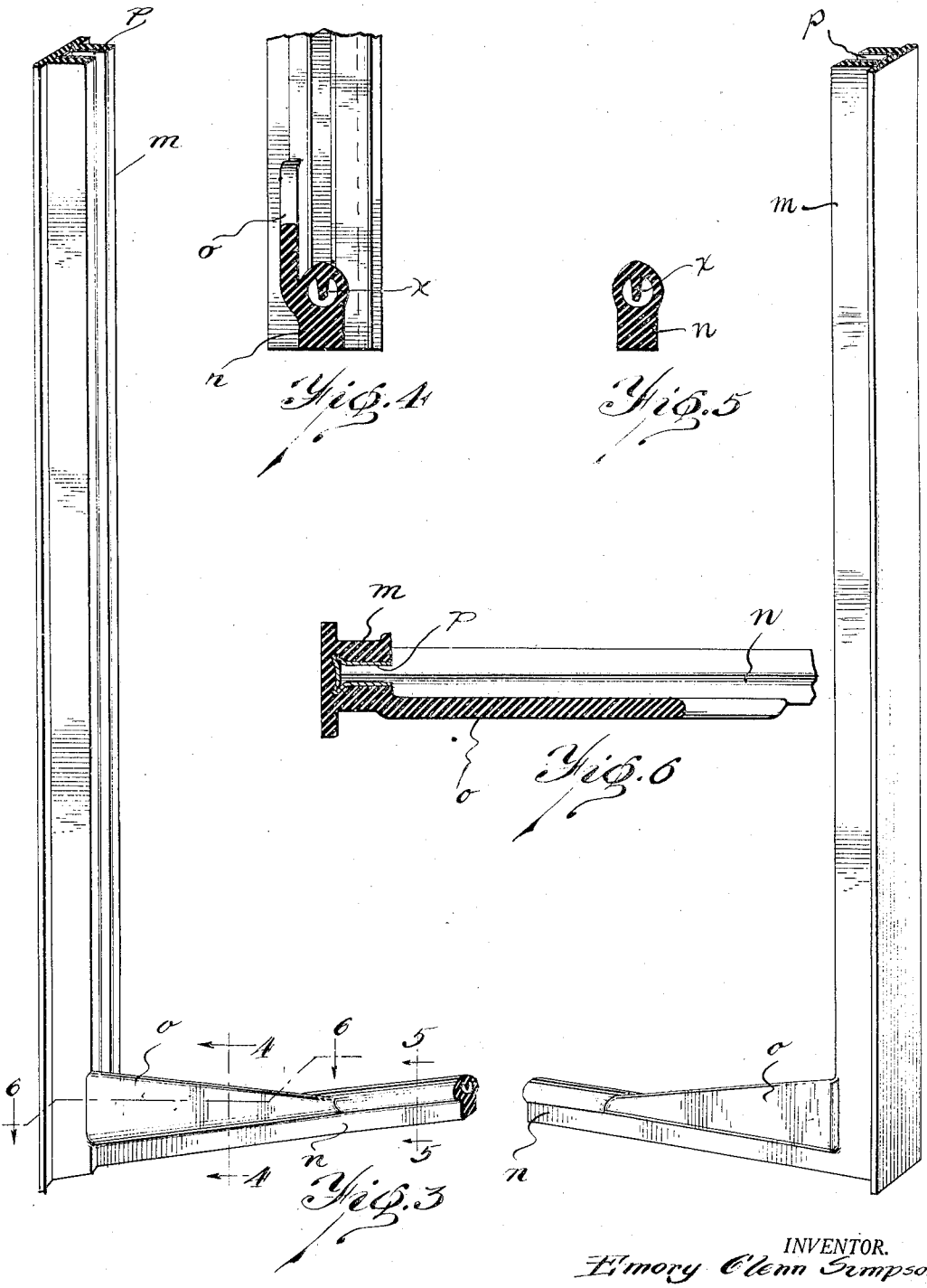

Patented Nov. 24, 1925.

1,562,661

UNITED STATES PATENT OFFICE.

EMORY GLENN SIMPSON, OF DETROIT, MICHIGAN, ASSIGNOR TO FISHER BODY CORPORATION, OF DETROIT, MICHIGAN, A CORPORATION OF NEW YORK.

WEATHER FRAME FOR WINDSHIELDS.

Application filed September 15, 1924. Serial No. 737,709.

*To all whom it may concern:*

Be it known that I, EMORY GLENN SIMPSON, a citizen of the United States, residing at Detroit, in the county of Wayne and State of Michigan, have invented certain new and useful Improvements in Weather Frames for Windshields, of which the following is a specification.

This invention relates to windshield weather strips and panel guides. It is the object of the present invention to provide a panel guide and weather strip for sliding windshields which is absolutely wind and weather proof.

A form of windshield which has lately come into vogue is a sliding single panel shield raised and lowered by a window regulator. It has been customary to use a rubber weather strip at the bottom of the shield and the usual window guides for sash channels. However, it has been found that considerable water and weather drive through at the corners regardless of the care taken in fitting the parts together. It is the object of the present invention to provide a unitary weather frame for the windshield panel.

In the drawings:

Fig. 1 is a vertical section of the new type window-regulator-controlled sliding windshield.

Fig. 2 is a section taken on the line 2—2 of Fig. 1.

Fig. 3 is a perspective of the new weather frame.

Fig. 4 is a section taken on the line 4—4 of Fig. 3.

Fig. 5 is a section taken on the line 5—5 of Fig. 3.

Fig. 6 is a section taken on the line 6—6 of Fig. 3.

The so-called new V—V type of windshield is described and claimed in the pending application, Serial No. 686,716, filed by Emory Glenn Simpson.

Briefly $a$ designates a ventilating trough secured by blocks $b$ and screws $c$ to the windshield sill $d$. A single panel shield $e$ is raised and lowered by window regulator $f$, provided with a pin $h$ which engages in a channel $i$ on the top of the windshield panel; $j$ designates the header pocket and $k$ designates the weather strip guarding said pocket. The opening through the ventilating trough is controlled by raising and lowering the panel.

In order to provide an absolutely weather and wind tight fitting around this sliding shield, I provide a weather frame shown in perspective in Fig. 3. This is a moulded rubber frame made of a single moulded piece to provide two upright channel or runways $m$, and the sill strip $n$ which is preferably of hollow section with reinforcing rib $x$ at the top so as to be collapsible or deformable when the grooved sash channel fits down over it.

Where the sill strip engages the vertical runways a moulded gusset $o$ serves to merge the sill strip into the vertical runways, preferably a piece of fabric, such as velvet or felt. $p$ is vulcanized into the vertical runways so as to provide anti-friction slide over the glass.

What I claim is:

1. In a windshield and window construction, a weather frame comprising a single integral frame of yieldable or deformable material forming a sill strip arranged to extend clear across the window opening and two vertical runways, the runways serving to guide the glass in vertrical movement and the sill strip to pack the panel at the bottom.

2. In a windshield and window construction, a weather frame comprising a single integral U-like frame of deformable material, the uprights forming panel guides for sliding movement of the panel and the bottom run forming a sill weather strip arranged to extend continuously across the bottom of the window opening.

3. In a windshield and window construction, a weather frame comprising a single homogeneous U-like frame of yieldable material having channel guides for the upright runs, and a connecting sill strip with gussets connecting the sill strips and the uprights at the corners.

4. In a windshield and window construction, a weather frame comprising a single homogeneous rubber U-like frame, the uprights of which are formed as channel guides for the sliding panel and the bottom of which is formed as a sill strip to extend clear across the window opening, all being a single integral frame.

5. In a windshield and window construction, a weather frame comprising a single U-like frame of moulded rubber forming vertical channel panel-runways, and an interconnecting bottom strip forming a sill packing.

6. In a windshield and window construction, a rubber weather frame comprising a single piece of rubber formed into upright panel-runways and a sill weather strip interconnected by corner gussets.

7. In a windshield and window construction, a weather frame comprising a single integral frame of moulded rubber forming vertical channel panel-runways and a sill strip and provided with gussets to connect the sill strip with said vertical runways, said gussets being set off to one side of the plane of the panel to permit the panel to pack against the sill strip and serving to seal the joint between the panel and the moulded rubber frame at the corners.

In testimony whereof I have affixed my signature.

EMORY GLENN SIMPSON.